C. L. WESTBROOK.
Seed Planter.

No. 46,738.  Patented Mar. 7, 1865.

UNITED STATES PATENT OFFICE.

C. L. WESTBROOK, OF NEW YORK, N. Y.

IMPROVED CORN-PLANTER.

Specification forming part of Letters Patent No. 46,738, dated March 7, 1865.

*To all whom it may concern:*

Be it known that I, CORINGTON L. WESTBROOK, of the city and county of New York, and State of New York, have invented and used a new and useful Machine for Corn-Planting; and I do hereby declare that the following is a full, clear, and exact description of the construction and operation of the same, reference being had to the annexed drawings and the letters of reference marked thereon, making a part of this specification, in which—

Figure 1:
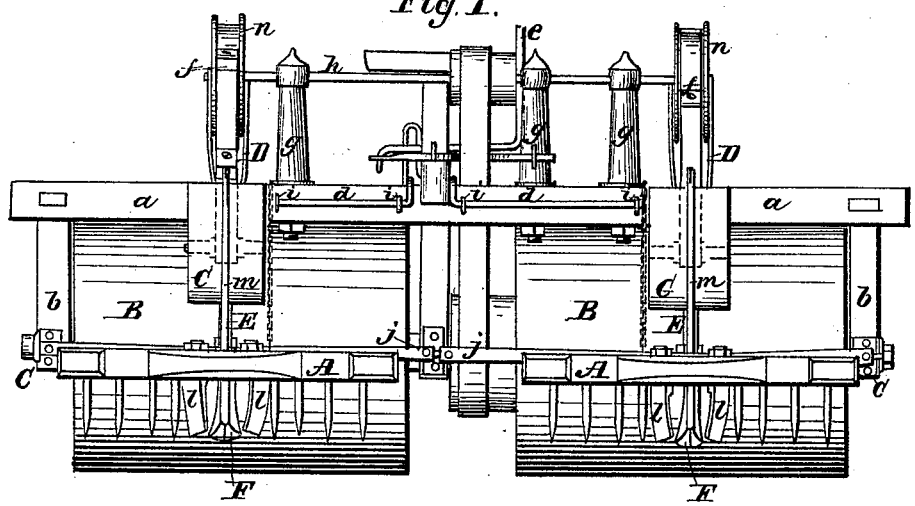
Figure 2:
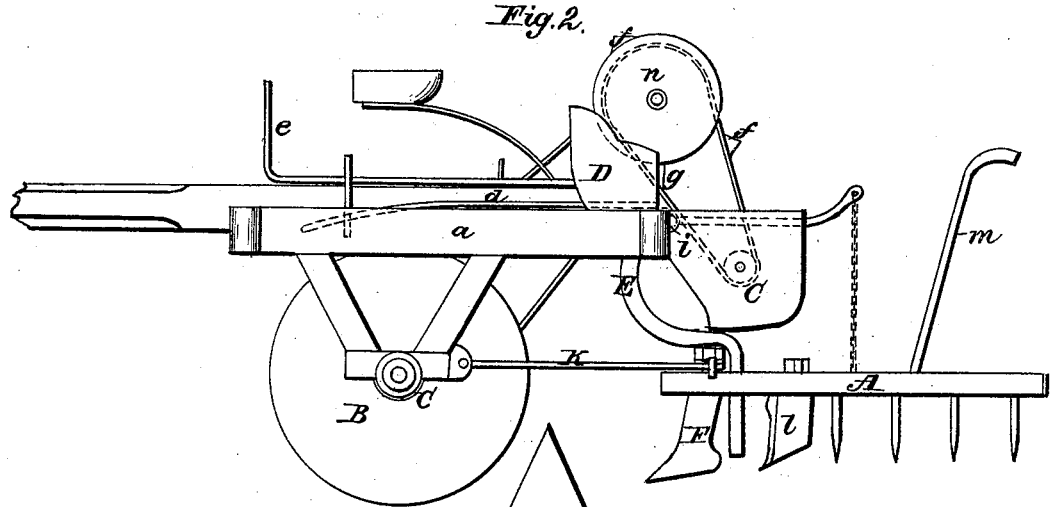
Figure 3:
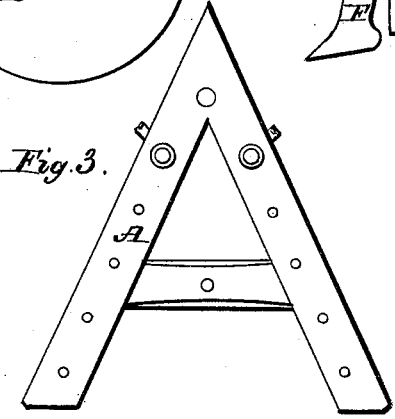

Figure 1 is a back view. Fig. 2 is a side view; Fig. 3, vertical view of harrow.

To enable others skilled in the construction of agricultural implements to make and use my invention, I will now proceed to describe its construction and operation.

I construct a frame, in the form of a rectangle, in a substantial manner and of suitable material, *a a*, in forms suitable for single or double teams. To the top side and midway of the pieces *a*, I fasten or attach the tongue, to which are attached the auxiliaries for hitching the animals. To the under side of frame-pieces *a*, I fasten the bearings *b b* and journal-boxes *c c*, for the reception of the axles of the rollers B B. I construct one or more rollers B B of wood or other suitable material, either solid or hollow, about four feet long, and from twenty-four inches to twenty-eight inches in diameter. I provide a seat for the driver, fastened in the most convenient manner and placed over the frame-work, so that the driver may have control with his feet of the pedals or levers *d d*, also the lever *e*, communicating with the switch and pulleys of the belt and cups *f f*. Upon the back piece of the frame *a*, I place the upright bearings *g g g*, which contain the shaft *h* of the pulleys of the belt and cups *f*. I form the levers *d d* in such shape as to incline half-way upon the lateral surface upon the back piece of frame *a*, and held thereto by staples or other means *i i i i*, the projecting back ends of said lever *a* having chains attached, which latter should be of the required length to be attached at or near the cross-piece of the A-shaped harrow, thus allowing said harrow to be raised or lowered when so required.

I construct the grain-boxes C C of such form and material best suited to the machine, also fastened securely to the frame-piece *a*, the lower part of which contains the pulleys for the belt and cups *f*.

I construct funnels D D of such form and material required, which latter are also fastened or attached to the frame-piece *a*. To the lower end of each funnel I fasten a flexible tube, E E, which passes at its lower end through the forward end of the harrow A and immediately back of the plowshare F F.

I construct the harrows about the shape and form of the letter A if the same should stand vertically. The upper or forward end of said harrow is held by the cross-bar *j j* and the braces or arms *k k*, as fastened or attached to the back of the journal-boxes of the rollers B. I provide and construct said harrows in the usual manner, with the required number of teeth placed equidistant from each other.

For the purpose of providing a safe mode of covering the furrows containing the seeds of corn, I provide and attach immediately back of the flexible tube E two steel-sharpened curved coverers, *l l l l*, to said harrow in such manner that its inner edges shall converge toward the center of said harrow, their size and form to be conformable for the required purpose. I construct a suitable plowshare, F, fastened securely to said harrow, of about the form as shown in Fig. 1. To the cross-bars in the A-harrows I attach the arms *m m*, for the purpose of raising said harrows when the latter require cleaning. I provide the pulleys *n n*, as attached to the shaft *h*, communicating by belt with the power-pulley, as attached to the shaft of the rollers B, thus giving motion to the belt and cups *f*. The usual coupling-switch for stopping the action of the discharging apparatus should be so provided.

What I claim as my invention, and desire to secure by Letters Patent, is—

The peculiar A-shaped harrow or its equivalent, with the plowshare F, the converging covers *l*, (the peculiar placing of the share, flexible tube, and covers,) together with the arms *k* and *j*, and cross-piece *k*, as attached, the whole as constructed and described, as and for the uses and purposes herein stated.

C. L. WESTBROOK.

Witnesses:
JULIUS SILVERSMITH,
RILY P. WILSON.